United States Patent [19]

Claar et al.

[11] Patent Number: 5,052,200

[45] Date of Patent: Oct. 1, 1991

[54] LOCKING DEVICE FOR LOCK COMPONENTS IN/ON VEHICLES

[75] Inventors: Klaus Claar, Sindelfingen; Jan Schilling, Gechingen, both of Fed. Rep. of Germany

[73] Assignee: Daimerler-Benz AG, Fed. Rep. of Germany

[21] Appl. No.: 545,624

[22] Filed: Jun. 29, 1990

[30] Foreign Application Priority Data

Jun. 29, 1989 [DE] Fed. Rep. of Germany ....... 3921314

[51] Int. Cl.[5] ......................... B60R 9/00; E05B 63/20

[52] U.S. Cl. ......................................... 70/123; 70/258; 224/315; 292/216; 292/218; 292/336

[58] Field of Search ................ 324/315; 292/216, 218, 292/DIG. 43, 336, 11; 70/121-123, 258

[56] References Cited

U.S. PATENT DOCUMENTS

| | | | |
|---|---|---|---|
| 1,815,580 | 7/1931 | Otte | 292/218 |
| 1,853,326 | 4/1932 | Walker | 70/121 |
| 2,592,647 | 4/1952 | Black | 292/218 |
| 3,287,945 | 11/1966 | Yulkowski | 70/493 |
| 3,719,297 | 3/1973 | Nowicki | 224/315 X |
| 3,905,624 | 9/1975 | Fujita | 292/216 X |
| 4,170,374 | 10/1979 | Garcia | 292/201 |
| 4,503,584 | 3/1985 | Malchow | 292/336 X |

FOREIGN PATENT DOCUMENTS

| | | | |
|---|---|---|---|
| 2822985 | 11/1979 | Fed. Rep. of Germany | 292/216 |
| 0153865 | 2/1982 | Fed. Rep. of Germany | 224/315 |
| 8616177 | 9/1986 | Fed. Rep. of Germany . | |
| 3642242 | 6/1988 | Fed. Rep. of Germany . | |
| 1175635 | 11/1958 | France | 292/336 |
| 387482 | 5/1965 | Switzerland | 292/336 |
| 2164086 | 3/1986 | United Kingdom | 292/216 |

*Primary Examiner*—Lloyd Gall

*Attorney, Agent, or Firm*—Evenson, Wands, Edwards, Lenahan & McKeown

[57] ABSTRACT

A locking device for lock components, for example on vehicles, with two rotary closures which are arranged at a distance from one another and are connected by means of a mechanical transmission element to form a synchronously rotating closure unit and which interact with two catch bolts assigned to the two rotary closures, each located in a housing having an orifice adapted to receive the catch bolts. The two rotary closures of the closure unit, in their release position, are each blocked by means of an associated control member against rotation into locking engagement with the associated catch bolt. The control members are movable into an unblocked position in response to penetration of the catch bolts into the orifice of the housing, and the locking advance of the rotary closures is permitted only after both catch bolts have penetrated fully into the orifice in the housing.

10 Claims, 2 Drawing Sheets

LOCKING DEVICE FOR LOCK COMPONENTS IN/ON VEHICLES

BACKGROUND AND SUMMARY OF THE INVENTION

The present invention relates to a locking device for lock components in or on vehicles, of the type having at least two closure elements located in spaced separation from one another and coupled to a control operating mechanism such as a lock cylinder. Locking devices of this general type are known to the art, as illustrated for example by German Offenlegungsschrift 3,642,242, which discloses a locking device adapted for two-point locking of doors, hoods or tailgates of vehicles, utilizing rotary-latch closures of the fork type conventional on vehicle doors. With the lock component opened, the rotary latch closures are held in their release position under a spring load. When the lock component is shut, the latch closures are rotated into their locking position by running with one fork end onto the associated catch bolt of the counter-component. In their locking position, the latch closures are blocked against pivoting by means of an automatic detent mechanism, so that the catch bolts, surrounded by their rotary-latch fork, are held in their closing position However, when the lock component is shut, the desired two-point locking is obtained only when the catch bolts strike virtually simultaneously against the corresponding forked rotary latches. If one of the catch bolts has too great a lead in relation to the other catch bolt, the catch bolt which first strikes its associated closure unit is rotated into its locking position without the associated forked rotary latch being capable of surrounding the second catch bolt as well. As a result, although both forked rotary latches are in their locking position, there is only a one-point locking of the lock component. The security of the lock component with single-point locking is even lower than in conventional lock components having only one locking point, but arranged centrally.

The known locking device is therefore suitable only for extremely torsion-resistant lock components which interact with a likewise torsion-resistant counter-component.

Furthermore, it is also known to use individual rotary closures on commercial ski carriers, wherein pivotably fastened shackles of the ski carrier can be locked only when they have also reached their closing position. As a control member there is a detent lever, by means of which the rotary closure designed as a closure hook is blocked against pivoting into its release position. The detent lever articulated on the closure housing is held in its blocking position by means of a tension spring connecting it to the closure hook. At the same time, a longitudinal portion of the detent lever projects into an end region of a latch orifice of the closure housing so that it is pivoted by the penetration of the catch bolt into the latch orifice. When the end position of the catch bolt in the latch orifice is reached, the detent lever is pivoted to such an extent that the rotary closure is released to advance into its locked position. At this moment, the prestressed tension spring automatically draws the rotary closure into its locking position. A core of a lock cylinder corotated by the rotary closure snapping shut is thereby transferred into its key withdrawal position, after which the one-point locking of the shackle can be secured simply by withdrawing the key.

One object of the present invention is to provide a locking device of the generic type described above, having the additional feature that during the locking of the closure unit by the associated catch bolts, a two-point locking of the lock component can be ensured largely independently of the torsional stability of the lock component or of the counter-component.

This object is achieved in a locking device according to the present invention by providing a separate sequence control for each of the two rotary closures of the closure unit. If, during the closing of the lock component, one of the two catch bolts has not reached its lockable end position, each of the rotary closure elements remains blocked in its release position. Although the other rotary closure is no longer blocked by its associated control member, it is held in the release position as a result of its rotational coupling to the other, still blocked, rotary closure. One-point locking of the locking device is thus prevented completely.

In an especially simple embodiment of the invention, each control member consists of a detent lever which is mounted pivotably on a closure housing and which interacts directly in a manner that is known per se with a rotary closure designed as a closure hook. However, because of their spring loading in the locking direction, such snap closures cannot be unlocked simply by tripping, but require a separate rotary drive, such as key operation of a lock cylinder, the cylinder core being rotationally coupled to the closure unit. Moreover, the locking position of the closure unit can be secured additionally via the lock cylinder when there is an appropriate key withdrawal position.

A restriction to a single key withdrawal position available in the locking position of the closure unit simplifies the operation of the locking device, since, with the key withdrawn, a locking of the lock component is always assured.

If a rotary closure is located with its end face opposite an accessible housing shell of the lock component at not too great a distance, the lock cylinder can be set into the wall surface and, being arranged coaxially relative to the axis of rotation of the rotary closure, can be rotationally coupled directly thereto. To allow a completely countersunk installed position of the lock cylinder despite the location of the rotary closure near the housing shell, the cylinder core can be connected to the rotary closure at the head end equipped with the key insertion orifice, all space-saving types of driving connections being possible for the rotational connection.

The advantage of this design is that the necessary length of the transmission element between the rotary closures can be reduced by the length of the cylinder housing. If the transmission element consists of a torsion-resistant hollow shaft or the like, such a reduction of the length of the transmission element can lead to an appreciable weight saving.

The locking device according to the present invention has proved especially advantageous in conjunction with a lightweight tubular frame as a lock component. It is particularly suitable as a locking device for a tilting frame of a load carrier which, for example, may be attached to a trunk lid of a motor vehicle. Tilting frames of this type make it possible to open the trunk lid when the tilting frame is swung up whilst, with the boot lid closed, the tilting frame, in its closing position, must be locked securely with a basic frame of the load carrier.

If the two individual closures of the tilting frame which are known, for example, from German Utility Model 8616177.6 are replaced by the locking device, the tilting frame can be operating from a side of the vehicle. Since trunk-loading activities often have to take place in a traffic flow, the gain in safety achieved by means of the locking device is considerable.

Other objects, advantages and novel features of the present invention will become apparent from the following detailed description of the invention when considered in conjunction with the accompanying drawings.

DETAILED DESCRIPTION OF THE DRAWINGS

Figure 1:
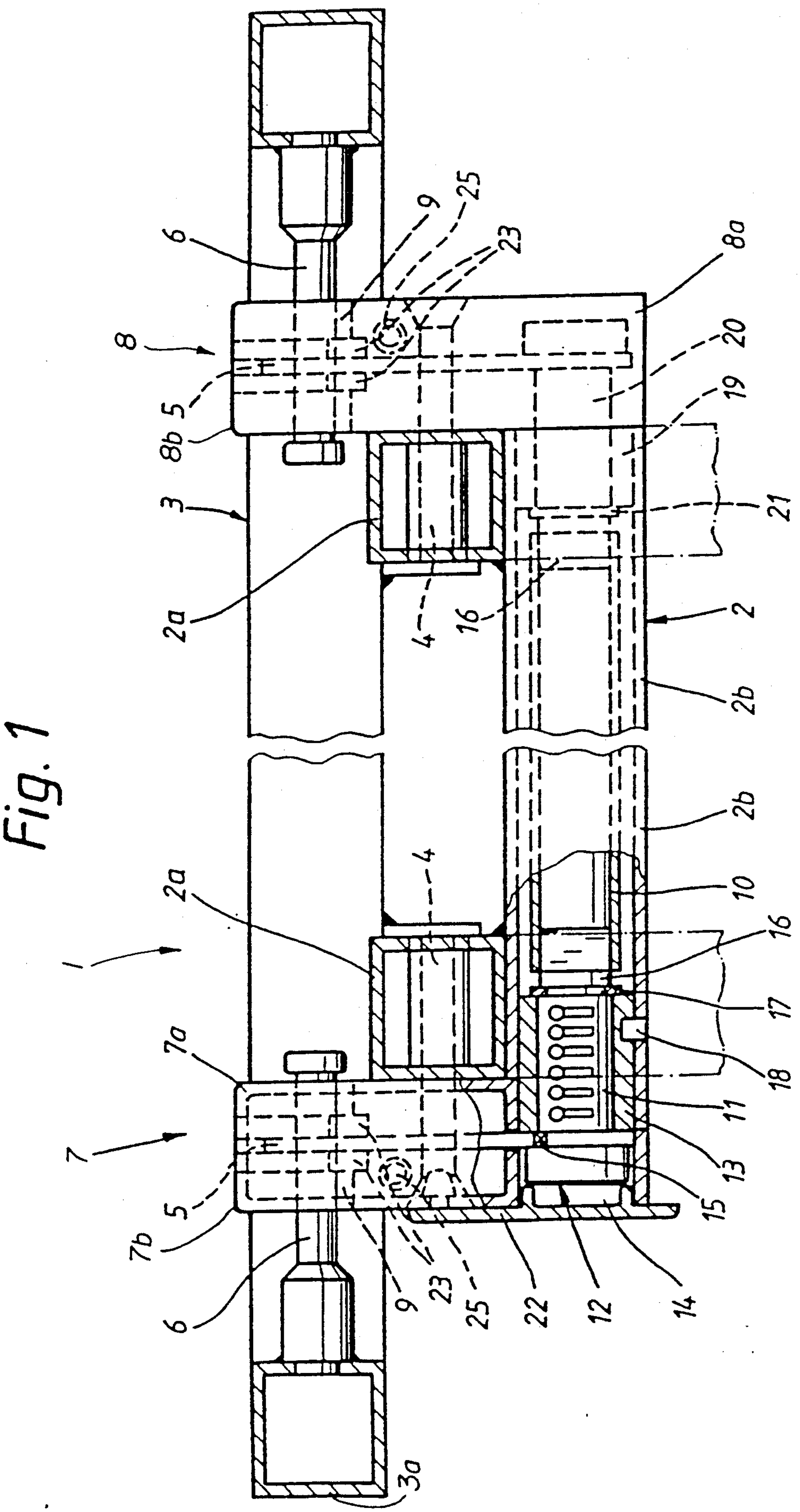
FIG. 1 shows a diagrammatic front view of a load carrier equipped with a locking device according to the present invention.

FIG. 1 shows a partially sectional view of a load carrier 1 which can be mounted on a trunk lid (not shown) of an automobile, especially a convertible, and which is suitable for, among other things, the transport of skis and the like.

So that the trunk space remains accessible even when skis or other articles of luggage projecting far forwards are transported on the load carrier 1, only the lower basic frame 2 of the load carrier 1 is connected firmly to the trunk lid, whilst the article to be transported can be fastened to a tilting frame 3 located above it.

The basic frame 2 and tilting frame 3 are respectively rectangular lightweight frames which consist of aluminum tubes. The width of the basic frame 2 corresponds here approximately to the width of the associated trunk lid, whilst the width of the tilting frame 3 is matched to the rear width of the automobile.

In the rear corner region of the basic frame 2, the tilting frame 3 is articulated on the basic frame 2 via a hinge bearing 4 on each of the two sides. The pivot axis defined by the two hinge bearings 4 extends essentially horizontally in the direction of the width of the vehicle, so that the tilting frame 3 can be swung up rearwards out of its illustrated position of rest in the opposite direction to the trunk lid pivotably fastened to the body at the front.

So that the tilting frame 3 can be fixed securely in its position of rest to the basic frame 2, between these there is provided a locking device which has two rotary closures 5 and two associated catch bolts 6 interacting with the rotary closures 5. Here, the rotary closures 5 are arranged in the front corner regions on the basic frame 2, while the catch bolts 6 are arranged on the titling frame 3. The rotary closures 5 could likewise be arranged on the tilting frame 3 and the catch bolts 6 on the basic frame 2.

The mirror-symmetrical rotary closures 5 are each mounted in a closure housing 7, 8 consisting of two housing shells 7*a*, 7*b*, 8*a*, 8*b* which are divided in parallel with the plane of rotation of the rotary closures 5 and which are connected to one another. Closure housings 7 and 8 which are identical in terms of their external dimensions are screwed opposite one another to the outer surfaces of the longitudinal tubes 2*a* of the basic frame. An upwardly directed latch orifice 9 is provided in each of the closure housings 7 and 8, located above the longitudinal tubes 2*a* so that catch bolts 6, projecting from the longitudinal tubes 3*a* of the tilting frame 3 towards the centre of the load carrier, penetrate into the latch orifice 9 during the closing advance of tilting frame 3. Moreover, the closure housings 7 and 8 project downwards relative to the associated longitudinal tube 2*a* at least to a point below that housing 8 covers an orifice at the right hand end of transverse tube 2*b*, as shown in FIG. 1, and the housing 7 surrounds an orifice at the left hand end of transverse tube 2*b* (FIGS. 2 and 3) through which the two closure housings 7 and 8 are connected to one another. In this manner, access to the openings at either end of transverse tube 2*b* can be blocked by the closure housings 7 and 8 so as to prevent tampering. However, in the embodiment depicted in FIG. 1, an operating orifice through the exterior surface of closure housing 7 is provided as a through opening to permit access to lock cylinder 12, as described below. The transverse tube 2*b* belongs to the basic frame 2 and is welded to the two longitudinal tubes 2*a*.

The rotary closures 5 of the two closure housings 7 and 8 are rotationally coupled through the hollow cross-section of the transverse tube 2*b* by means of a torsion-resistant hollow shaft 10. A left-hand end of the hollow shaft 10 is connected to the associated rotary closure 5 via a cylinder core 11 of a lock cylinder 12, the cylinder core 11 being mounted rotatably in a cylinder housing 13 in the conventional manner. Lock cylinder 12 is countersunk in an operating orifice 14 of the closure housing 7 to such an extent that the rotary closure 5 through which the cylinder core 11 passes is fixed axially between an end face of the cylinder housing 13 located on the operating side and a thickened head of the cylinder core 11. The rotational connection between the cylinder core 11 and the rotary closure 5 is made via a driving connection 15. Since the cylinder housing 13 can be inserted with an exact fit into the end region of the transverse tube 2*b*, and since the rotary closure 5 is also mounted via the cylinder core 11 of the lock cylinder 12, this necessarily provides a coaxial mounting of the rotary closure 5 in relation to the longitudinal mid-axis of the transverse tube 2*b*. To ensure axial retention of the cylinder core 11 in relation to the cylinder housing 13, a square end 16 of cylinder care 11 projecting from the cylinder housing 13 on the same side as the hollow shaft is supported relative to the end face of the cylinder housing 13 by means of a retaining ring 17. To prevent the cylinder housing 13 itself from being pulled out axially, there is a grub screw 18 which is screwed through a lower bore in the transverse tube 2*b* into a blocking bore of the cylinder housing 13.

An end region of the hollow shaft 10 is slipped positively onto the square end 16, and the hollow shaft 10 can have a corresponding square cross-section over its entire length. Alternatively, however, it is also possible to use a round hollow shaft 10 and design only its end portions as a square.

The rotational mounting of the right-hand rotary closure 5 is based on a similar concept, thereby ensuring its coaxial mounting in relation to the corresponding rotary closure 5. For this purpose, the closure housing 8 has a bearing sleeve 19 which is connected firmly to the latter, and which can be inserted positively into the right-hand end of the transverse tube 2*b*. Mounted in the bearing sleeve 19 is a shaft stub 20, onto the end face of which located in the closure housing 8 the rotary closure 5 is fastened so as to bear on the wide side. For securing the shaft stub 20 axially in the bearing sleeve 19, the shaft stub 20 has an annular collar 21 which is supported on that end face of the bearing sleeve 19 located on the same side as the hollow shaft.

Adjacent to the annular collar 21, the shaft stub 20 is also equipped with a square end 16, by means of which a plug-in driving connection with the hollow shaft 10 is made.

To prevent the operating orifice 14 for the key actuation of the lock cylinder 12 from becoming soiled, the operating orifice 14 is covered by means of a sealing cap 22. This sealing cap 22 consisting of flexible plastic is articulated above the operating orifice 14 in a bore of the outer shell of the closure housing 7 and engages positively into the bore of the operating orifice 14 in the manner of a plug by means of a short annular shank projecting from its wide side. To operate the lock cylinder 12, the sealing cap 22 can be bent upwards by pulling on a downwardly projecting tab of the latter, the positive connection between the annular shank and the operating orifice 14 being broken, and can subsequently be pivoted in its covering plane, thereby exposing the operating orifice 14.

So that the catch bolts 6 are secured free of rattling in the locked state, the latch orifices 9 of the two closure housing 7 and 8 have in the lower end region elastomeric buffers 23 which are arranged adjacent to the plane of rotation of the rotary closures 5. When the catch bolts 6 advance during the closing of the tilting frame 3, these buffers 23 are compressed somewhat by catch bolts 6, and thereby ensure substantial freedom from play of the locking action.

Figure 2:
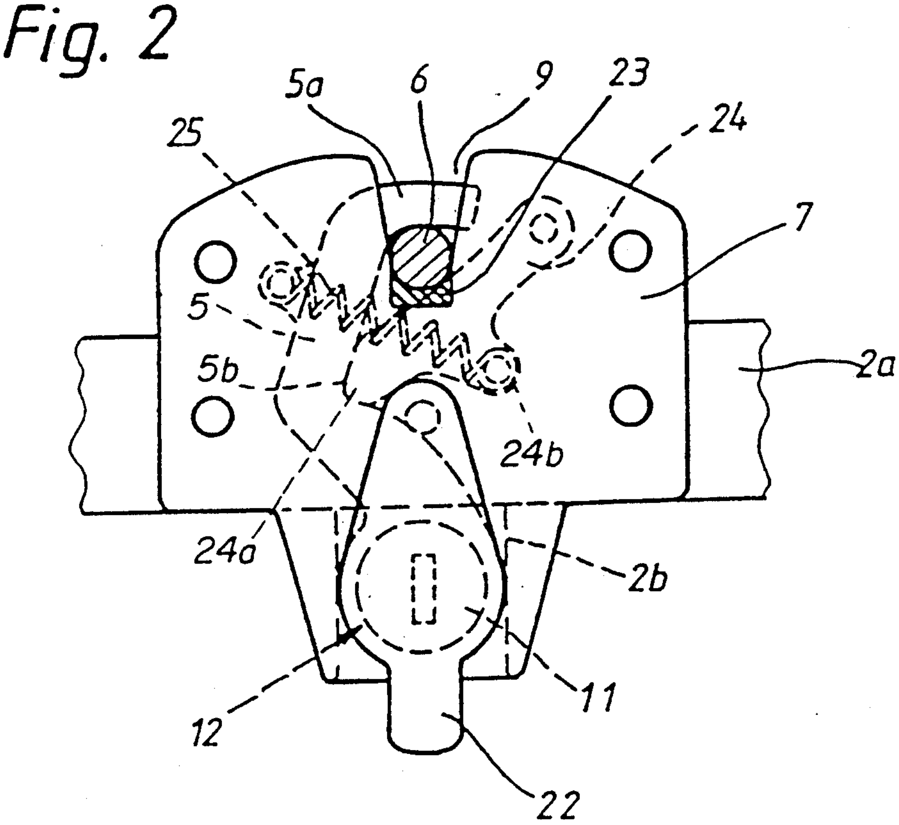
FIG. 2 shows a side view of a rotary closure of the locking device in the locked state.

As shown in FIG. 2, the rotary closures 5 are made in the form of closure hooks having hook ends 5*a* which, in the locked state, hold the associated catch bolt 6 down in its lower end position in the latch orifice 9, for which purpose the hook end 5*a* of the rotary closures 5 engages over and blocks the latch orifice 9. The hook end 5*a* of the rotary closures 5 is angled approximately tangentially in relation to the axis of rotation of rotary closure 5, so that the main extension of the rotary closures 5 is from the latch orifice 9.

Figure 3:
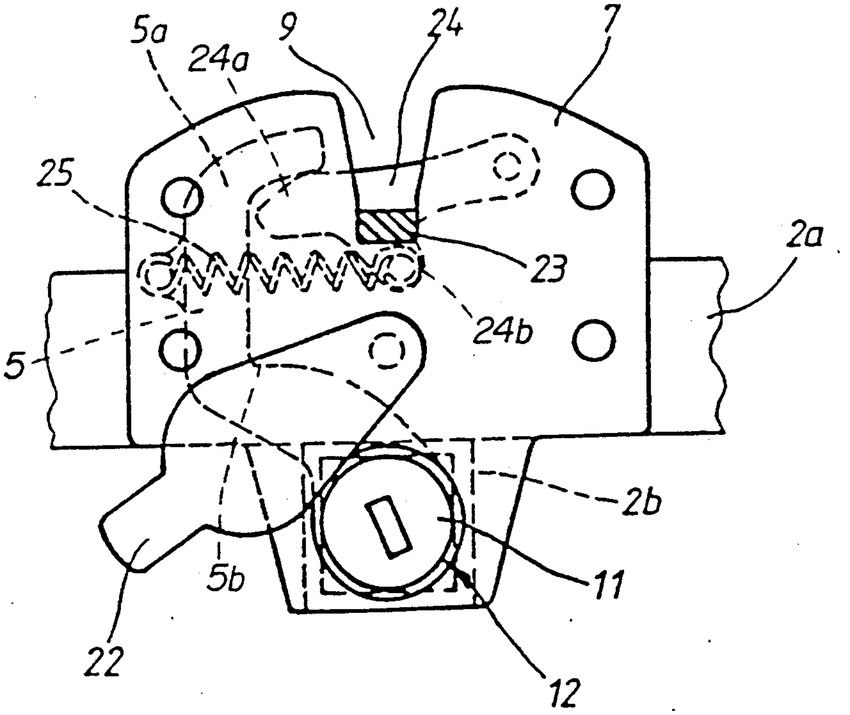
FIG. 3 shows the side view according to FIG. 2 with the rotary closure in the unlocked state.

So that the locking advance of the rotary closures 5 does not have to be exerted by key rotation, the rotary closures 5 are designed as automatic snap closures. For this purpose, articulated on each of the closure housings 7 and 8 in the pivoting plane of the two rotary closures 5 is a detent lever 24, by means of which the associated rotary closure 5 is blocked against pivoting in its release position, as shown in FIG. 3. The detent lever 24 is pivotably connected to housing 7 at one end next to the latch orifice 9 on the side opposite the rotary closure 5. Its other end, designed as a control nose 24*a* or camming surface, is held bearing under the prestress of a tension spring 25 against the narrow side of the associated rotary closure 5 facing the detent lever 24. The narrow side of the rotary closure 5 at the same time forms a control track which is sensed by the control nose 24*a* of the detent lever 24. For this purpose, starting from the lower narrow side of the hook end 5*a*, it extends first obliquely downwards at an obtuse angle to approximately half the pivoting length of the rotary closure 5 and thereafter merges, in an approximately right-angled arc 5*b* matched to the engagement profile of the control nose 24*a*, into a further length region which is located opposite the hook end.

Approximately in the middle of its longitudinal extension, the detent lever 24 has, on its narrow side facing away from the latch orifice 9, a prolongation 24*b*, on which one end of the tension spring 25 is suspended. The second end of the tension spring 25 is suspended on the rotary closure 5 itself approximately even with the bottom of the latch orifice 9.

By virtue of the articulation conditions and the prestress of the longitudinally stretched tension spring 25, as explained above, two stable end positions of the rotary closure 5 are defined by the detent lever 24. One such position corresponds to the locking state, and the second corresponds to the unlocking state of the rotary closure 5. In the locking state according to FIG. 2, the detent lever 24 is directed obliquely downwards and engages positively with its control nose 24*a* into the arc matched to its contour and located on the narrow side of the rotary closure 5. The positive connection is maintained by the pull of the spring, since a breaking of the positive connection would necessarily involve a more pronounced longitudinal stretching of the tension spring 25.

In the unlocking state according to FIG. 3, the detent lever 24 is pivoted upwards into a virtually horizontal position, passing through approximately half the height extent of the latch orifice 9. To allow the detent lever 24 to assume this position, the rotary closure 5 must be pivoted through an angle of approximately 20 degrees in the counterclockwise direction. Since tension spring 25, thereby extending approximately horizontally, exerts a dextrorotatory torque on the detent lever 24, the detent lever 24 is held bearing against the lower edge of the hook end of the rotary closure 5. Rotation of the rotary closure 5 in the direction of the latch orifice 9 is no longer permitted by the detent lever 24 in this position, since the rotary closure 5 butts against the end of the control nose 24*a* before its hook end engages into the latch orifice 9.

In contrast, a locking advance of the two rotary closures 5 is caused when the tilting frame 3 is swung down into its closing position. The catch bolts 6 penetrate into the latch orifice 9 of the closure housings 7 and 8 strike the top edge of the detent levers 24 passing through the latch orifice 9. As catch bolts 6 penetrate further into orifice 9, they displace detent levers 24, pivoting these too downwardly into the latch orifice 9. When the two catch bolts 6 reach their end position in the associated latch orifice 9, the detent levers 24 of the two rotary closures 5 are simultaneously pivoted into their lower end position. Since that point of articulation of the tension spring 25 located on the detent lever is thereby also pivoted, the rotary closures 5 snap into their locking position automatically under the pull of the spring.

If, however, when the tilting frame 3 is swung down, only one of the two catch bolts 6 reaches its end position in the latch orifice 9, then neither rotary closure 5 can pivot into its locking position. That is, although the two detent levers 24 have been pivoted to such an extent that they no longer inhibit the rotation of the rotary closures, nevertheless, the hook end of the one rotary closure 5 strikes against the not yet completely penetrated catch bolt 6, thereby preventing its closure. Since the two rotary closures 5 are connected to form a synchronously rotationally coupled closure unit, the locking advance of both rotary closures 5 is consequently blocked. In this case, the tilting frame 3 has to be pressed down so that the second catch bolt 6 also reaches its end position, after which the two rotary closures 5 snap shut together.

It is possible to unlock the rotary closures 5 by key operation of the single lock cylinder 12, which is located on the front-seat passenger side of the automobile, and the cylinder core 11 of which is rotationally connected to the closure unit. This lock cylinder 12 has only a single key withdrawal position which is provided in the rotary position of the cylinder core 11 relative to the cylinder housing 13, with the closure unit locked, and in which, with the key withdrawn, a mechanical interlock of the cylinder core 11 with the cylinder housing 13 is ensured via tumblers. Thus, with the key withdrawn, there is also at the same time the guarantee that both rotary closures 5 are locked.

To unlock the closure unit, the key is inserted into the cylinder core 11, after which the mechanical interlock with the cylinder housing 13 is canceled. The closure unit can now be unlocked by rotating the key approximately 20 degrees in the counterclockwise direction. Since the rotary position of the cylinder core 11 is maintained by means of the blocked release position of the rotary closures 5, the key cannot be withdrawn. During the subsequent locking advance of the rotary closures 5, the cylinder core 11 is once again corotated into its withdrawal position, so that the key can be withdrawn without a closing rotation of the latter having to be carried out.

Although the present invention has been described and illustrated in detail, it is to be clearly understood that the same is by way of illustration and example only, and is not to be taken as limiting the invention. The spirit and scope of the present invention are limited only by the terms of the appended claims.

We claim:

1. Locking apparatus for lock component on a vehicle comprising at least two rotary closures arranged in spaced separation from one another and connected by means of a mechanical transmission element to form a synchronously rotating closure unit, each of said rotary closures having associated therewith a catch bolt arranged on a counter component and each of said rotary closures being adapted to move into locking engagement with said catch bolt in response to movement of said catch bolt into a locking position during a closing movement of said counter component, wherein each of said rotary closures also has a control member uniquely associated therewith, each of said control members being movable between a blocked position in which said rotary closure is prevented from moving into locking engagement with said catch bolt, and an unblocked position in which said rotary closure is permitted to move into locking engagement with said catch bolt, said control member being adapted to move from said blocked position to said unblocked position in response to movement of said catch bolt into said locking position, wherein movement of said rotary closures into locking engagement with said catch bolts is blocked until each of said catch bolts is moved into said locking position, wherein said rotary closures consist of closure hooks mounted pivotably in an associated closure housing, each of said closure housings having a latch orifice for the penetration of the corresponding catch bolt into said locking position, wherein said control member comprises a detent lever articulated on the closure housing in the pivoting plane of each of the rotary closures whereby said rotary closures are prevented from moving into locking engagement with said catch bolts by being supported by one end of the associated detent lever, said detent lever passing through an end region of the latch orifice, and wherein said detent levers are caused to pivot counter to a spring load during penetration of said catch bolts into said latch orifice, whereby, after the locking position of said catch bolts has been reached, said support of said detent levers on said rotary closures in shifted to such an extent that said rotary closures are pivotable into a locking position covering the latch orifice.

2. Locking apparatus according to claim 1 wherein said rotary closure unit is rotationally coupled to a cylinder core of a lock cylinder.

3. Locking apparatus according to claim 2 wherein said lock cylinder has a single key withdrawal position, which corresponds to the rotary position of the cylinder core when said rotary closure unit is in said locking position.

4. Locking apparatus according to claim 2 wherein one of said rotary closures of said closure unit is arranged near an accessible housing shell of said lock component, wherein said lock cylinder is arranged in the housing shell in axis-parallel alignment with the axis of rotation of said rotary closure located near said shell, and wherein said cylinder core is coupled to said rotary closure.

5. Locking apparatus according to claim 4 wherein said lock cylinder is arranged coaxially relative to the axis of rotation of said rotary closure coupled thereto, and wherein said cylinder core of said lock cylinder is connected to said rotary closure via a driving connection.

6. Locking apparatus according to claim 5 wherein said lock cylinder is countersunk in the wall surface of said lock component, wherein said driving connection is provided between said cylinder core and said rotary closure at an operating end of said cylinder core projecting from a cylinder housing, and wherein said cylinder core is connected at its opposite end to said transmission element.

7. Locking apparatus according to claim 1 wherein the axes of rotation of said rotary closures extend coaxially, and wherein said transmission element consists of a torsion-resistant hollow shaft.

8. Locking apparatus according to claim 1 wherein said counter component comprises a pivotably mounted tubular frame.

9. Locking apparatus according to claim 8 wherein said tubular frame is a tilting frame articulated on a basic frame, said basic frame being attachable as the base of a load carrier to a body of a vehicle.

10. Locking apparatus according to claim 9 wherein said basic frame of said load carrier can be fastened to a trunk lid of a motor vehicle.

* * * * *